United States Patent [19]

Frisk et al.

[11] Patent Number: 4,831,814
[45] Date of Patent: May 23, 1989

[54] PULL TYPE SWATHER

[75] Inventors: Kenneth A. A. Frisk, Oak Bluff; Irving B. Kardal, Winnipeg, both of Canada

[73] Assignee: Ford New Holland, Inc., New Holland, Pa.

[21] Appl. No.: 69,423

[22] Filed: Jul. 2, 1987

[51] Int. Cl.⁴ ............................................. A01D 43/00
[52] U.S. Cl. ...................................... 56/181; 56/192; 56/228
[58] Field of Search ....................... 56/15.2, 15.5, 162, 56/181, 192, 228, 186

[56] References Cited

U.S. PATENT DOCUMENTS

| | | | |
|---|---|---|---|
| 3,214,002 | 10/1965 | Kirkpatrick et al. | 56/181 |
| 4,512,140 | 4/1985 | Blakeslee | 56/181 |
| 4,682,462 | 7/1987 | Johnson | 56/228 |

Primary Examiner—John Weiss
Attorney, Agent, or Firm—Larry W. Miller; Frank A. Seemar; Darrell F. Marquette

[57] ABSTRACT

A pull type swather having double swath and enhanced operating to transport mode change capabilities. A subframe is mounted forwardly of a rear frame and the two are pivotally connected. The table of the swather includes a pair of draper decks operable to be independently moved relative to each other and to the table. A hitch is pivotally connected to the subframe and a hydraulic cylinder is operable to adjust the angle of the hitch relative to the table. The subframe is locked to the rear frame during operation and until the transport mode is desired wherein the subframe is unlocked and pivoted relative to the rear frame. Provision is made for automatically interchanging between the transport and operating modes.

11 Claims, 11 Drawing Sheets

PULL TYPE SWATHER

INTRODUCTION

This invention relates to a pull type swather or windrower and, more particularly, to a pull type swather which features a double swath capability and enhanced transport to operation mode conversion characteristics.

BACKGROUND OF THE INVENTION

As the size of wheat farms increases, it is desirable to reduce the amount of operator time in the field by enlarging operating machinery. In cutting a crop with a swather or windrower, it is clearly desirable to cut as much crop as possible with one pass of the swather so that time of operator and equipment in the field can be reduced. Thus, the size of swathers has increased over the last few years from ten and twenty to forty feet in width and even wider.

While the increased width of swathers serves the function of decreasing field time well, the size of large swathers has unattractive features. For example, the large size of such swathers in operation causes transportation problems as often the crop in the field is far removed from the location where the equipment is generally stored and it may be necessary to transport the swather along public roads and through openings designed for smaller vehicles. While a transport mode has been designed for many large swathers, such a mode requires various relatively large changes to the swather such as adding stabilizer wheels, wheel spindles, hitches and the like to avoid an unstable apparatus while the swather is under transport. This is undesirable from an efficiency and a cost viewpoint.

Yet a further undesirable feature of most large pull type swathers is that only one swath, separated from another swath by a relatively large distance, can be obtained. If a second swath is located adjacent a first swath, the tractor may have to travel through the first swath which is obviously unacceptable. Two adjacent swaths are desirable in order to reduce the operating time of a combine which will subsequently gather and thresh the swath. While double swath capabilities on pull type swathers have been obtained, these are usually obtained only by extending the draper deck. Such an addition is expensive and bulky and the complexity of the addition often may result in failure of the addition in the field as well as poor swath formation.

Yet a further undesirable feature of present large swathers is that as ground speeds increase and in travelling over rough terrain, the typical sidewise extending operating position is difficult to maintain in its correct operating position because the moment created by the heavy weight of the swather will tend to create an angle between the swather and a line normal to the pulling tractor. Such an angle causes cutting dislocations and inconsistent swaths. To overcome this problem, an approach used has been to lighten the machine which can result in the deletion of attractive features such as table flotation, table lift characteristics and the like. This is clearly unsatisfactory.

Yet a further problem with pull type swathers relates to the flexibility of laying the swath. With present pull type swathers, there is no ability to lay a swath in the centre portion of the swather and, as well, to also lay the swath at either end of the table.

SUMMARY OF THE INVENTION

According to one aspect of the invention, there is disclosed a swather comprising a frame, a table connected to said frame, a first draper deck on said table having a belt operable to move bidirectionally in directions substantially parallel to the longitudinal axis of said swather, a hitch pivotally connected to said frame about a substantially vertical axis and extension and retraction means connected between said t-bar and said frame.

According to a further aspect of the invention, there is disclosed a method of obtaining a double swath using a pull type swather comprising pivotally mounting a hitch to a swather about a vertical axis adjacent one end of said swather, moving the draper deck of the table of said swather in a first direction, adjusting the angle between said hitch and said swather to obtain a first operating condition, moving said draper deck of said swather in the opposite direction from said first direction and adjusting said angle between said hitch and said swather to obtain a second operating condition.

According to yet a further aspect of the invention, there is disclosed a swather comprising a frame, said frame including a rear frame and a subframe, said subframe being pivotally connected to said rear frame, a hitch connected to said frame about an axis and locking and release means between said rear frame and said subframe.

According to yet a further aspect of the invention, there is disclosed a pull type swather comprising a frame, a hitch pivotally connected to said frame adjacent one end of said frame, a table connected to said frame, a wheel assembly connected to said frame on said one end and weight mounting means located on said one end of said frame adjacent said wheel assembly.

According to yet a further aspect of the invention, there is disclosed a pull type swather comprising a frame, a table connected to said frame, a hitch pivotally connected to said frame, adjustment means to adjust the angle of said hitch relative to said table, a first draper deck mounted to said table, a belt for said draper deck, first power means to move said belt in a first direction and a second direction opposite to said first direction and first movement means for said draper deck being operable to move said deck relative to said table.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

Figure 1A:
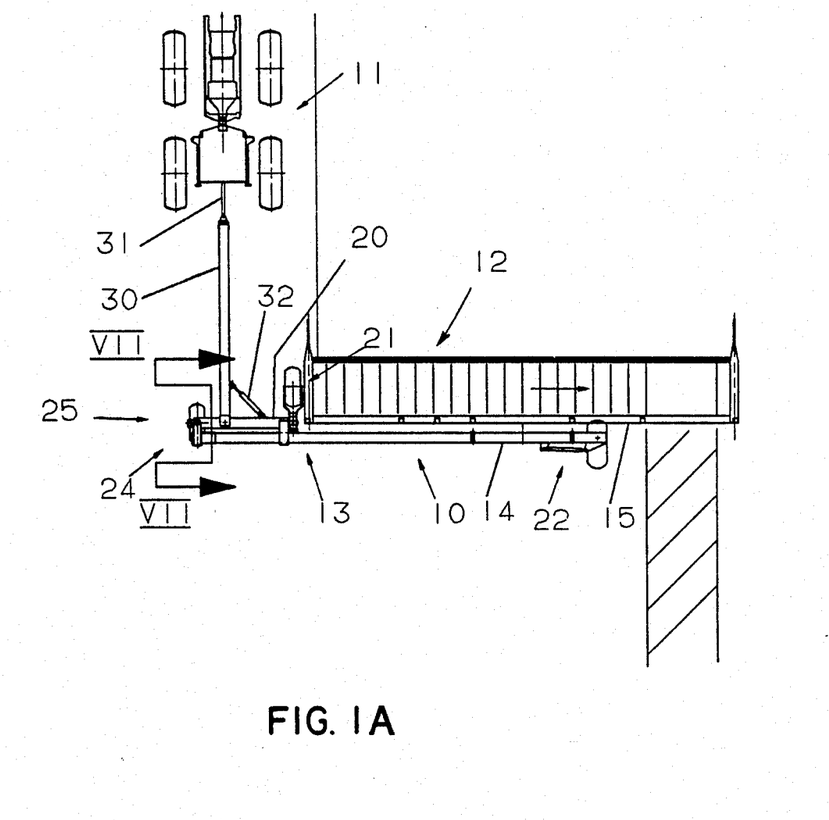
FIG. 1A is a diagrammatic plan view of the swather according to the invention in an operating mode wherein a first swath is being laid.
Figure 1B:
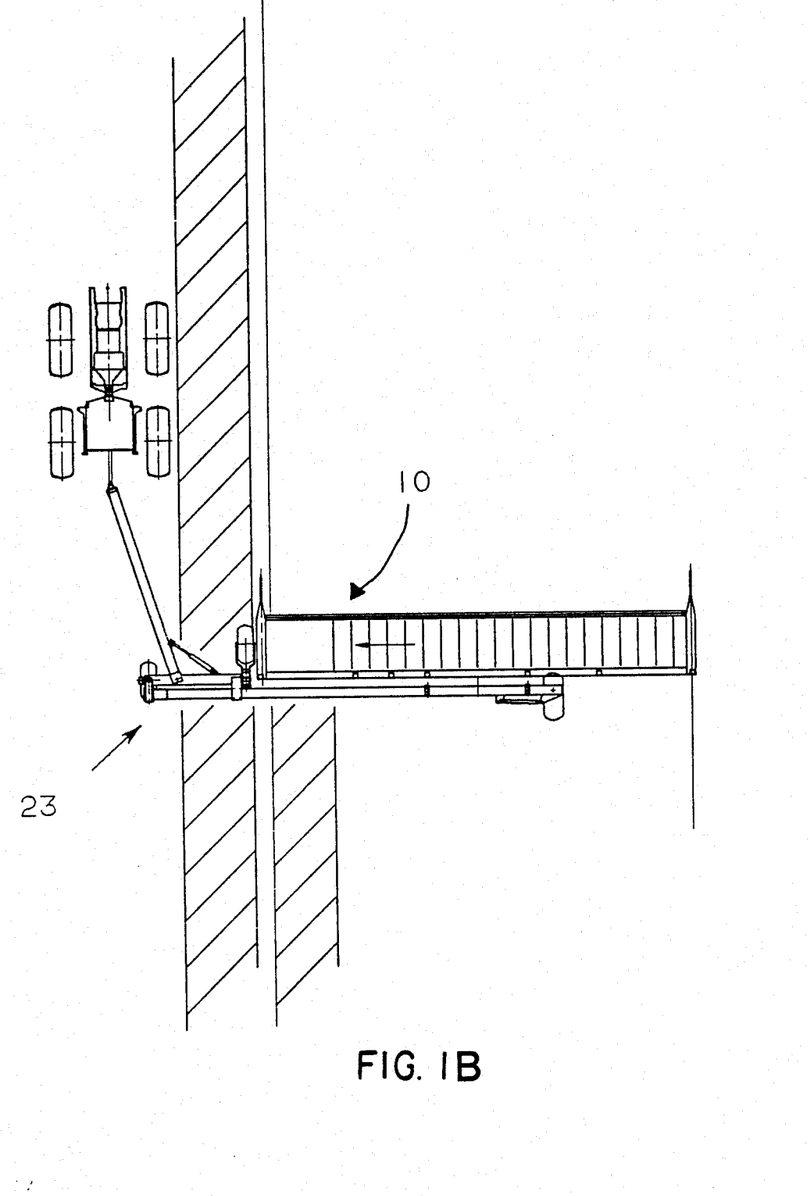
FIG. 1B is a diagrammatic plan view of the swather of FIG. 1A but wherein a second swath is being laid.
Figure 1C:
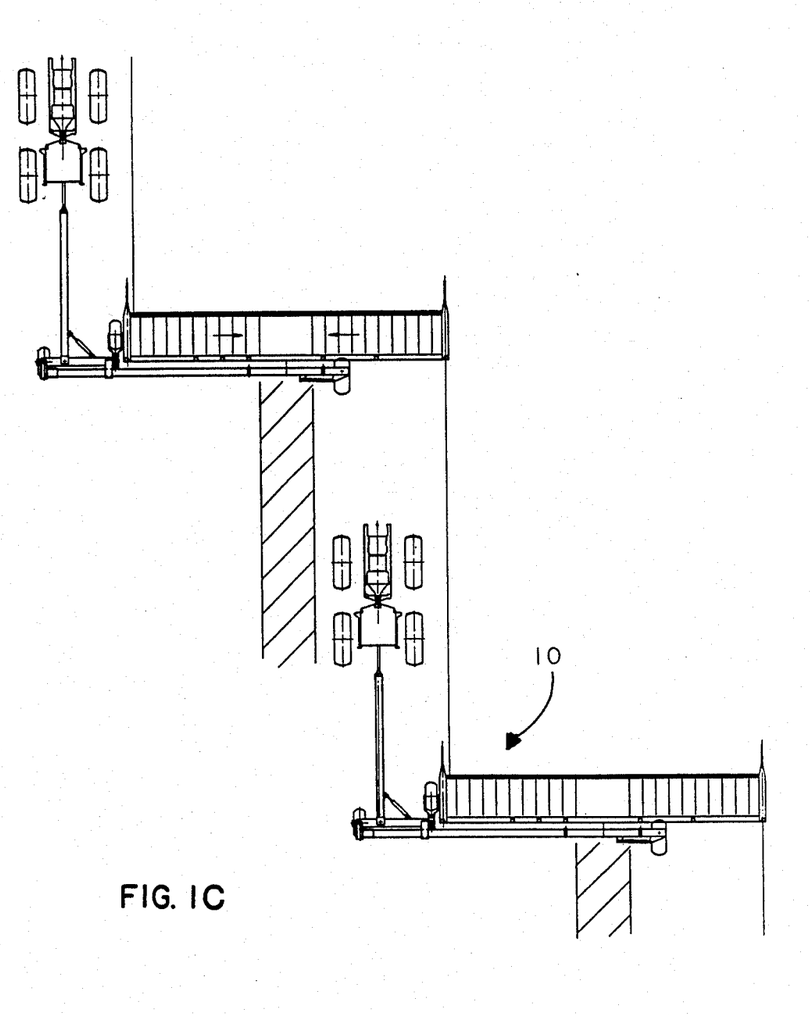
FIG. 1C is a diagrammatic plan view of the swather of FIG. 1A but wherein a centre delivery swath is being laid.
Figure 3:
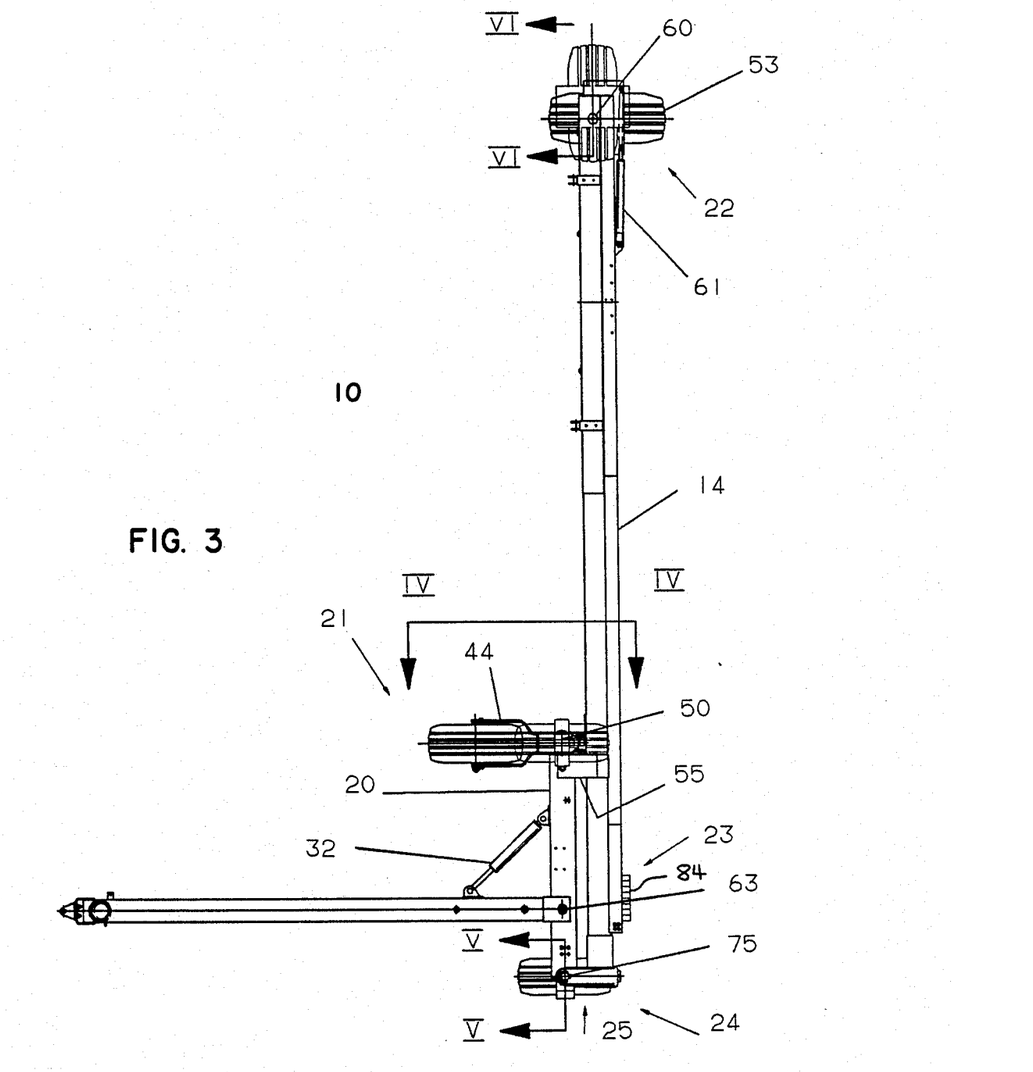
FIG. 3 an enlarged plan view of the swather according to the invention illustrating in greater detail the rear frame, subframe and transport wheels and their associated elements in the operating mode with their transport mode positions illustrated in phantom.

Referring now to the drawings, a pull type swather is shown generally at 10 in FIGS. 1 and 3 and is pivotally connected about axis 63 to a hitch 31 which extends to a tractor 11. The swather 10 includes a set of draper decks generally illustrated at 12 and shown in more detail in FIG. 9 as will be explained hereafter. The draper decks 12 are mounted to a table 15 which table 15 is mounted to a frame generally shown at 13 which comprises a rear frame 14 and a subframe 20, the table 15 being mounted to the rear frame 14. A transport wheel assembly is generally shown at 21 and in more detail in FIG. 4, the transport wheel assembly 21 being pivotally mounted on the subframe 20 as will be explained in greater detail hereafter. A rear frame wheel assembly is generally shown at 22 and in more detail in FIG. 6, the rear frame wheel assembly 22 being mounted on the rear frame 14 as will be explained in greater detail hereafter. A subframe wheel assembly 25 is mounted on the subframe 20 as illustrated in FIGS. 1 and 5 as will also be explained in greater detail hereafter.

A weight mounting or attachment area generally shown at 23 in FIG. 3 is located on the rear frame 14 near the connection area generally denoted 24 between the rear frame 14 and the subframe 20 as illustrated more clearly in FIG. 7 and as will be explained in greater detail hereafter. A series of weights 84 are located on the rear frame 14 as more clearly seen in FIG. 8 adjacent the subframe wheel assembly 25 and on the end of the frame 13 which is closest to the pivotal connection of the hitch 31 with the subframe 20 and as also explained in greater detail hereafter.

A hitch 31 is pivotally connected about a substantially vertical axis on each of the subframe 20 of the frame 13 of the swather 10 and the tractor 11. The vertical axis 63 on the subframe 20 is located adjacent one end of the swather 10. An extension and retraction means by way of a first hydraulic cylinder 32 is located between the hitch 31 and the subframe 20 of the swather 10 and may be extended or retracted from a position remote from the swather 10 to alter the angle between the subframe 20 and the hitch 31 as clearly seen in FIGS. 1B and 1C.

With further reference to FIGS. 9A, 9B, 10 and 11, the set of draper decks 12 comprise a twin set. Each of the first and second draper decks 12 has a belt 33 mounted between a hydraulically driven drive pulley 34 and an idler pulley 35 which are, in turn, individually mounted to draper frames 40 movable on the table 15 of the swather 10. Respective movement means by the way of hydraulic motors 41 are provided for each draper deck 12 to allow each draper deck 12 to move bidirectionally in directions substantially parallel to the longitudinal axis of the swather 10 and relative to the table 15 to each other. Each motor 41 is mounted on the table 15 and drives a pinion 36 which meshes with a respective chain 37 connected between two points on each draper deck 12. The pinion and chain arrangement allows each draper deck 12 to be moved relative to the table 15 and to each other. Similarly, the hydraulic motors which drive the drive pulleys 34 of the belts 33 may be reversed either independently or together such that the direction of motion of the belts 33 may move simultaneously in one direction or they may move in opposite directions. Referring to FIG. 1A, for example, it will be seen the direction of motion of the belts 33 is identical for each belt 33, that motion being to the right which acts to deposit a swath at the right hand end of the swather 10. Referring to FIG. 1B, it will be seen that the direction of motion for the belts 33 is also identical but in an opposite sense to the direction of motion seen in FIG. 1A. This motion acts to deposit a swath at the lefthand end of the swather 10. Finally, referring to FIG. 1C, the belts 33 of the draper decks 12 are running in opposite directions and acting to lay a swath between the two draper decks 12 and centrally of the swather 10.

The draper decks 12, as noted, may be moved with the chain and pinion arrangement relative to table 15 and to each other. In FIG. 1A, the draper decks 12 are illustrated as being adjacent each other in the left hand side of the table 15 of swather 10 thereby leaving an open area at the right hand end of the swather 10. In FIG. 1B, the draper decks 12 are illustrated as being adjacent each other in the right hand side of the table 15 of swather 10 thereby laying a swath at the left hand end of the swather 10. In FIG. 1C, the draper decks 12 are separated so as to leave an open area in the central area of the swather 10 and thereby being operable to lay a swath between the draper decks 12.

Figure 2:
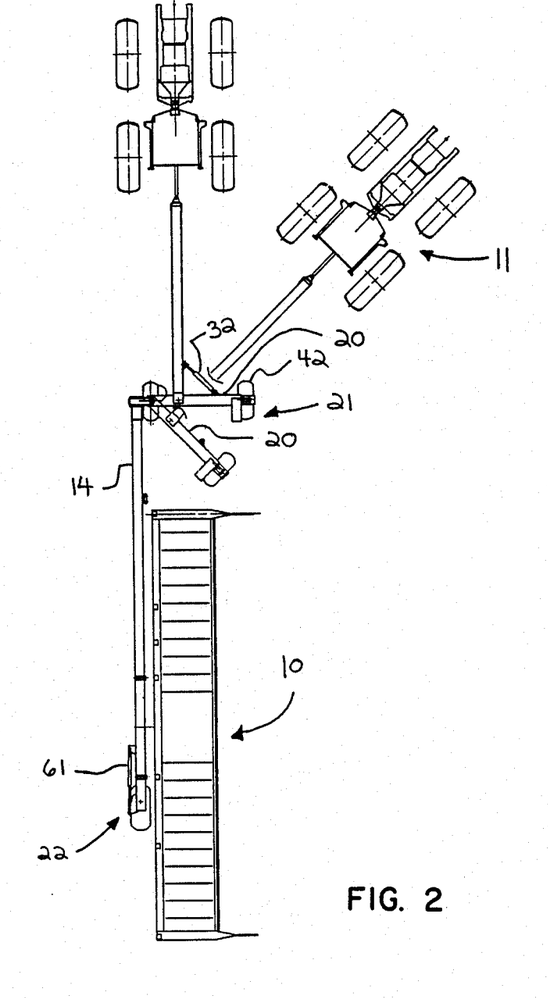
FIG. 2 is a diagrammatic plan view of the swather of FIG. 1 in the transport mode.
Figure 4:
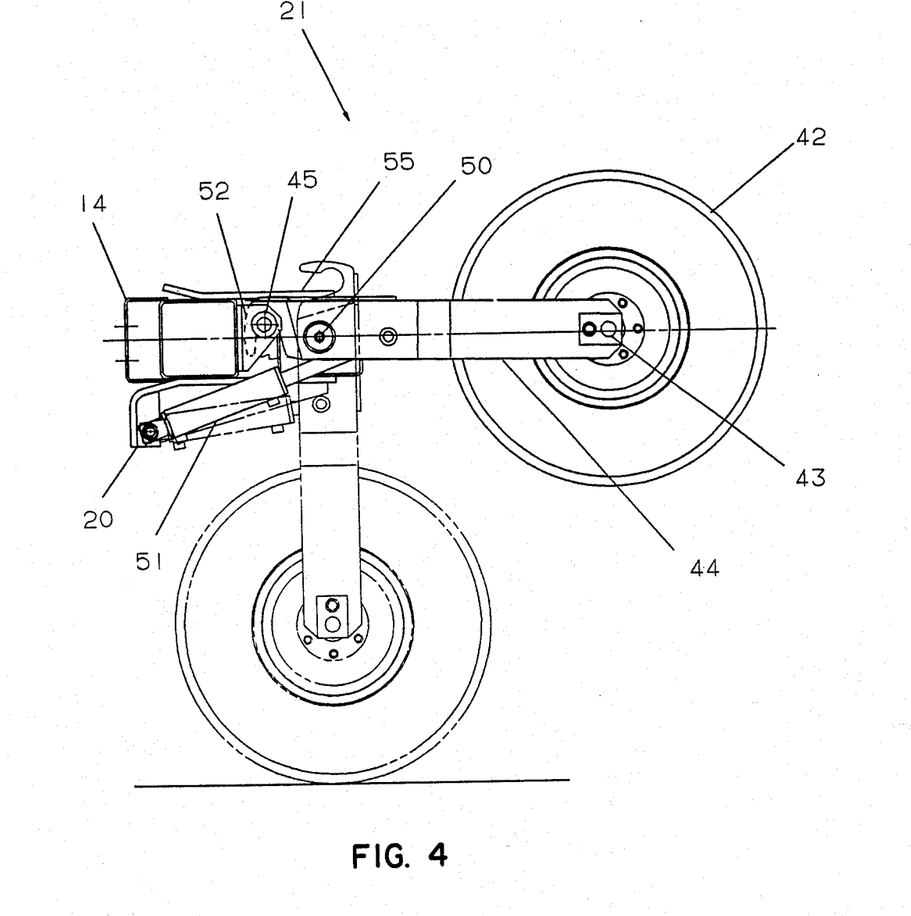
FIG. 4 is an enlarged view of the transport wheel and its operating elements taken along IV—IV of FIG. 3 in the operating mode with its transport mode position being shown in phantom.
Figure 5:
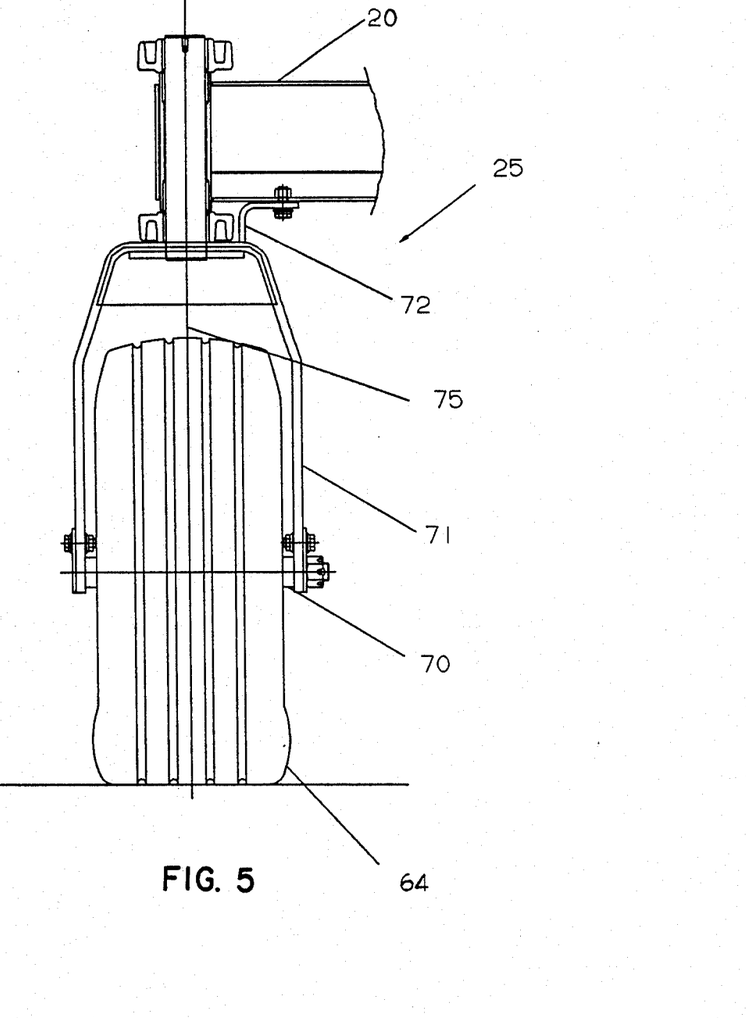
FIG. 5 is a view of the subframe wheel and its operating elements taken along V—V of FIG. 3.

Referring now to the transport wheel assembly 21 which is shown in more detail in FIG. 4, a tire 42 is mounted to an axle 43 which is held by a fork 44. Fork 44 is pivoted at axis 50 and a hydraulic cylinder 51 is connected between the fork 44 and the subframe 20. Hydraulic cylinder moves the fork 44 together with a locking and release means in the way of a locking bracket 52 between the raised position indicated with solid lines which shows the transport wheel assembly 21 in its operating mode and the lowered position indicated with phantom lines which shows the transport wheel assembly 21 in its transport mode. In the operating mode, the locking bracket 52 retains a pin 45 connected to the rear frame 14 which securely couple or lock the rear frame 14 and the subframe 20 together in a substantially parallel relationship as seen in FIGS. 1 and 3. In the transport mode with the transport wheel assembly in its lowered position, the locking bracket 52 is disengaged from its contact with the pin 45 of the rear frame 14 such that the rear frame 14 and subframe 20 proceed in a substantially normal relationship as best seen in FIG. 2. Thus, the locking bracket 52 is operable by movement of the transport wheel assembly 21. Guide plates 55 is connected to the subframe 20 to allow for smooth movement of the subframe 20 into a parallel relationship with the rear frame 14 when the swather 10 is moved from the transport to the operation mode and to deactivate the pivotal and relative movement of the rear frame 14 and subframe 20 about axes 75,82.

Figure 6:
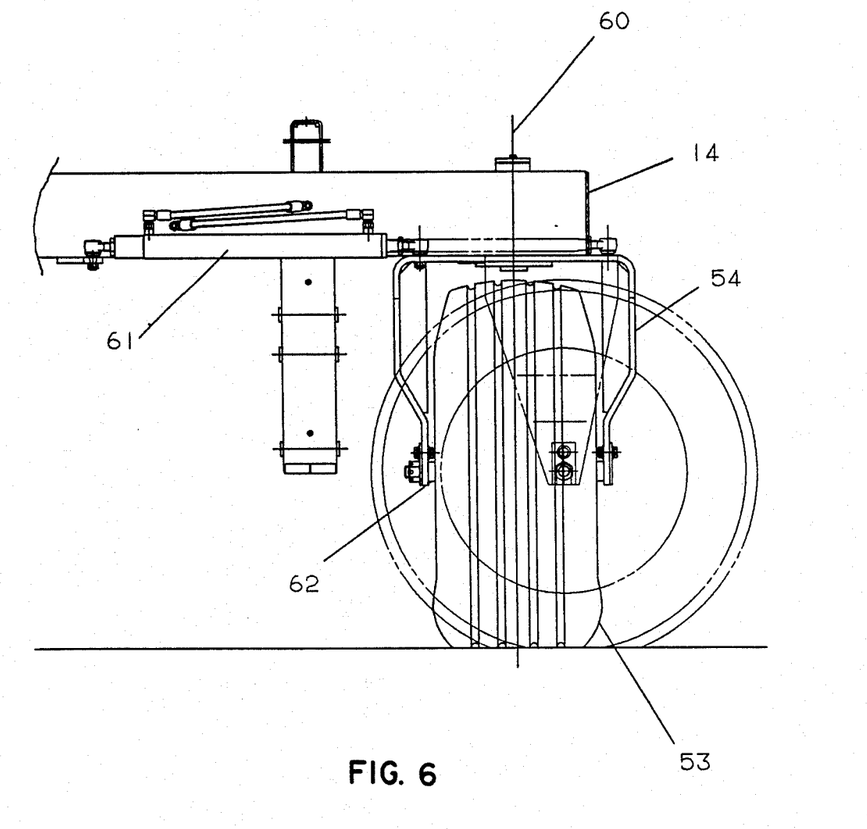
FIG. 6 is a view of the rear frame wheel and its operating elements taken along VI—VI of FIG. 3.

The rear frame wheel assembly 22 of FIGS. 1 and 3 is shown in greater detail in FIG. 6 and is connected to the rear frame 14. A tire 53 is mounted to a fork arm 54 by an axle 62, which fork arm 54 is connected to rear frame 14 and which is pivotal about an axis 60. A hydraulic cylinder 61 is connected between the fork arm 54 and the rear frame 14. Hydraulic cylinder 61 is operable to move the fork arm 54 between the operating mode position shown in FIGS. 1,3 and 6 and the transport mode position shown in FIG. 2 and in phantom in FIG. 6, which position is normal to the operating mode position as is clear.

The subframe wheel assembly 25 of FIGS. 1 and 3 is shown in greater detail in FIG. 5. The subframe wheel assembly 25 is not rotatable about the axis 75 but, rather, maintains a continuous orientation on the subframe 20 as illustrated. A tire 64 is connected by axle 70 to fork leg 71 which is securely mounted in the subframe 20 and maintained in that position by a bracket 72 connected between the fork leg 71 and the subframe 20.

Figure 7:
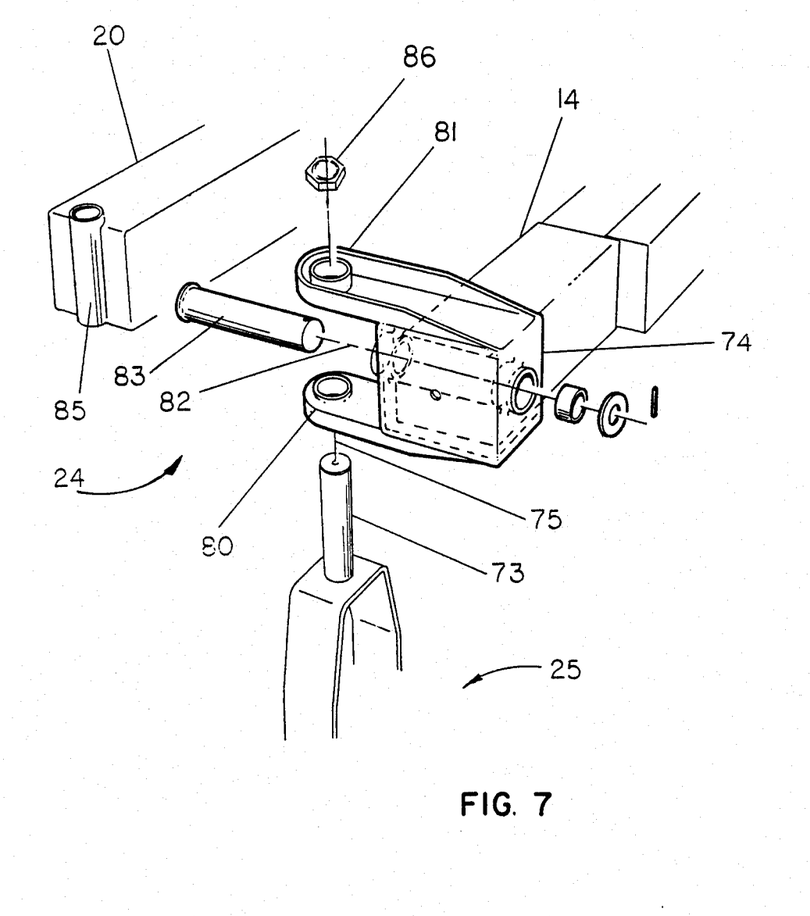
FIG. 7 is an enlarged and exploded isometric view of the twin axis elements between the rear frame and the subframe.

The connection area 24 between the rear frame 14 and the subframe 20 of FIG. 3 in its operating mode is shown in greater detail in FIG. 7. The subframe 20 is pivotally connected to rear frame 14 about axis 75 using the pin 73 which is part of the fork leg 71 of the subframe wheel assembly 25. Pin 73 is inserted through the lower leg 80 of bracket 74 and thence through the pin receptacle 85 on subframe 20, through the upper leg 81 of bracket 74 where it is then retained by a retaining nut 86. Bracket 74 is rotatable about the axis 82 of pin 83 and relative to the rear frame 14 which also rotates about axis 82.

Figures 8, 9A, 9B:
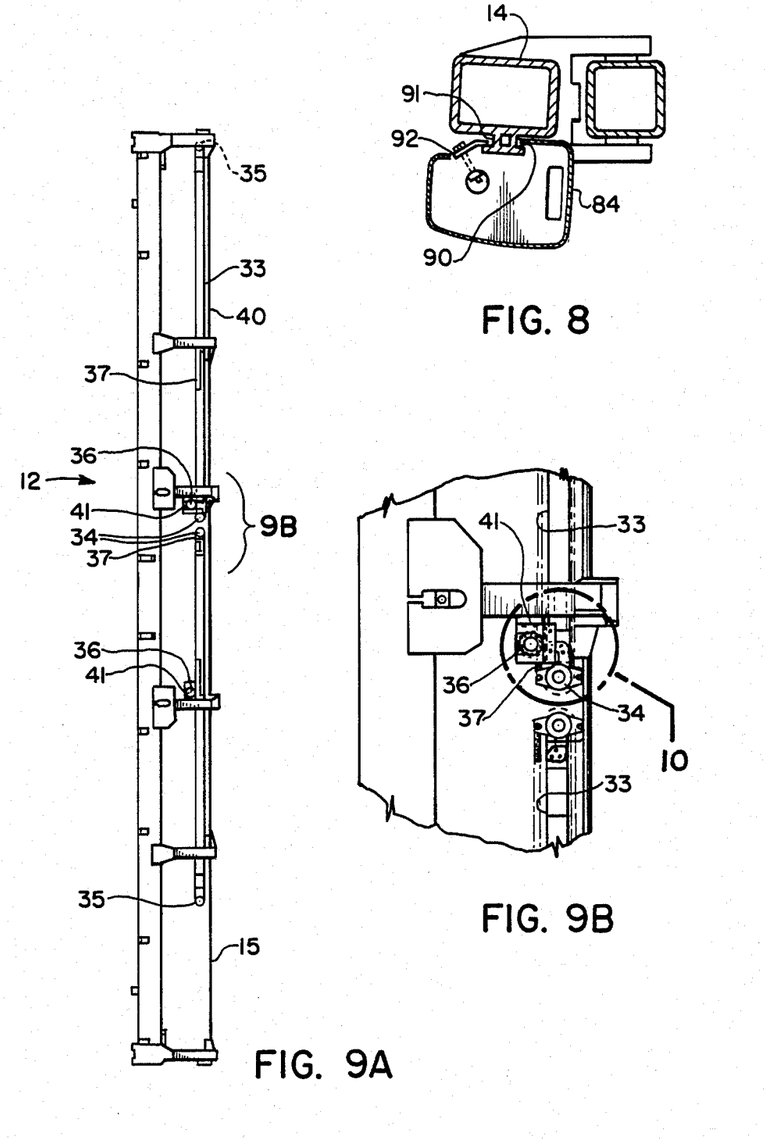
FIG. 8 is an isometric view taken along the line VII—VII of FIG. 1A of the weights mounted on the rear frame.
FIG. 9A is a diagrammatic rear view of the table of the swather, draper decks and their associated operating elements.
FIG. 9B is an enlarged partial view of various of the elements illustrated in FIG. 9A.
Figure 10:
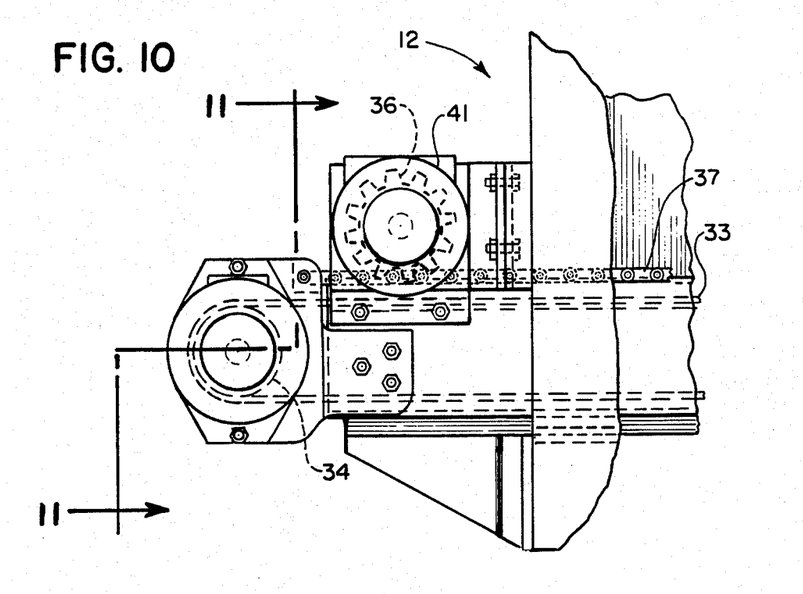
FIG. 10 is an enlarged detail view of a portion of the draper deck shown in FIGS. 9A and 9B, corresponding to the circle 10 shown in FIG. 9B.
Figure 11:
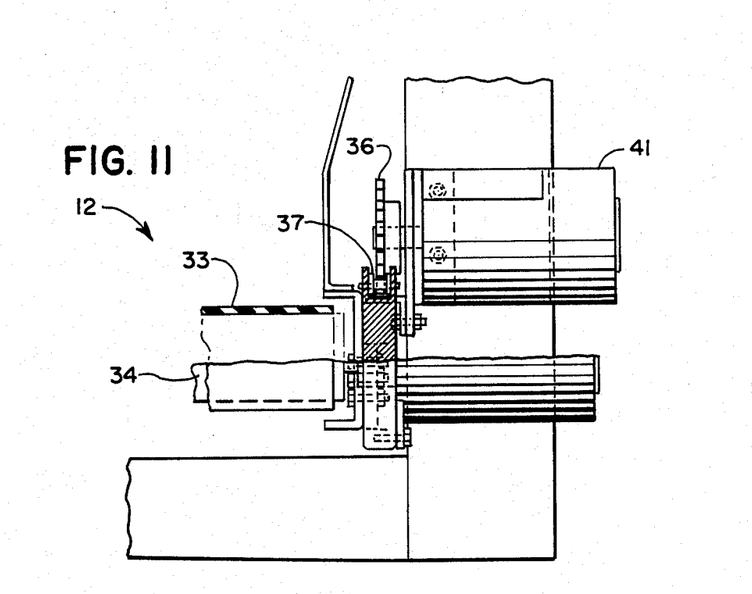
FIG. 11 is a partial cross-sectional view taken along line 11—11 of FIG. 10.

The weight attachment area 23 of FIG. 3 is illustrated more clearly in FIG. 8. A plurality of weights 84, only one of which is shown in FIG. 8, are connected to the rear frame 14 by attaching a weight lip area 90 to a receiving complementary extension 91 located on the bottom portion of rear frame 14. A retaining bracket 92 is then secured to the weight 84 and extends over the top of the complementary extension 91 of rear frame 14. It is advantageous to add the weights 84 to the rear frame 14 in a leftmost position on the side of the rear frame 14 closest to the pivotal connection of the hitch 31 and as close to the subframe wheel assembly 25 as practicable. In this manner, a moment opposite to the moment caused by the side draft of the swather 10 will be created which will act to enhance the retention of the true operating position of the swather 10. Depending on the operating conditions under which the swather 10 is to be used, an increase or decrease in the number of the weights 84 may be made.

OPERATION

In operation, it will be assumed that the swather 10 is in the operative mode and is in the condition illustrated in FIG. 1A. That is, the hitch 31 is in the straight ahead position, the transport wheel assembly 21 is in the engaged or raised position, the rear frame wheel assembly 22 is parallel with the direction of travel and the two draper decks 12 are located adjacent to each other at the left hand side of the table 15. The belts 33 of the draper decks 12 will be travelling in a first direction which is the same direction; that is, the top surface of both belts 33 will be travelling to the right as seen in FIG. 1A and acting to lay a swath at the right hand end of the swather 10 as illustrated.

In addition, it will be noted that because of the engagement of the transport wheel assembly 21 and, in particular, the locking bracket 52 of that assembly, with the rear frame 14, the connection area 24 will be rigid and no movement of the rear frame 14 relative to the subframe 20 will be permitted about either of the axes 75,82.

In addition, the operator of the tractor 11 with the attached swather 10 will have decided on the number of weights 84 which may be desirable to add to the rear frame 14 (FIG. 8) under the particular ground and weather conditions which he may expect to encounter.

It will again be assumed that the operator desires to lay a double swath for ease of combining. The operator will commence to lay a first swath in a first operating condition as illustrated in FIG. 1A. Although the position of the hitch 31 is illustrated in the straight ahead position, the operator may retract hydraulic cylinder 32 which will then adjust the angle between the swather 10 and the table 15 to create an acute angle between the hitch 31 and the longitudinal axis of the swather 10 which is normal to the direction of the movement of the tractor 11 in order to move the tractor 11 closer to the uncut crop.

As the operator proceeds around the field, he will encounter the first swath. At this point, he will activate the chain and pinion arrangement for the draper decks 12 and move the draper decks 12 under the influence of the hydraulic motors 41, pinions 36 and chains 37, to the position indicated in FIG. 1B, that is to a position opposite from the first position on the table 15 adjacent the right hand side of the table 15. The direction of movement of the top surface of both belts 33 will be reversed to take the direction of movement indicated by the arrow in FIG. 1B. The angle between the hitch 30 and the swather 10 will be adjusted by moving the hitch 30 to the left with cylinder 32 so that the tractor 11 will miss the swath cut from the previous round. The operator will then commence to lay the second swath at the left hand end of the swather 10 as illustrated in a second operating condition, the second swath being laid adjacent the first swath.

As the operator proceeds with the swathing operation, the weights 84 which are attached to the rear frame 14 act as a counterweight thereby creating a counter moment to the sidedraft forces caused by the swather 10. It will be noted that the weights 84 are mounted to the rear frame 14 in a location as close to the subframe wheel assembly 25 as is practicable (FIG. 3).

Following the completion of the swathing operation, the swather 10 will be transported to a different location and, to that end, it will assume the transport mode. With reference to FIGS. 2, 3 and 4, hydraulic cylinder 51 will be retracted which will lower tire 42 and fork 44 to allow tire 42 to contact the ground. The locking bracket 52 will be disengaged from the pin 45 connected to the rear frame 14 which will then allow relative movement between the rear frame 14 and subframe 20 about axes 75,82.

As the transport wheel assembly 21 disengages from the pin 45 and rear frame 14 and is lowered into its ground contact position, hydraulic cylinder 61 connected between the rear frame 14 and the fork arm 54 is extended such that the rear frame wheel assembly 22 assumes a final transport position as indicated in phantom in FIGS. 3 and 6 and as illustrated in FIG. 2. The operator will then simply commence to tow the swather 10 which, under the towing force, will assume the position as illustrated in FIG. 2.

When the operator wishes again to assume the operating mode, he will reverse portions of the above procedure. He will more rearwardly until the subframe 20 has pivoted about axis 75 and is in a position parallel to the rear frame 14 with the guide plate 55 in position straddling the rear frame 14 as illustrated in FIG. 4.. He will then extend hydraulic cylinder 51 to raise the tire 42 and fork 44 with locking bracket 52 until the locking bracket 52 becomes engaged with pin 45 on rear frame 14. Simultaneously, hydraulic cylinder 61 will be retracted until the rear frame wheel assembly 22 assumes the position shown in FIG. 3. The swather 10 is then ready once again for the swather operation.

With reference to FIG. 1C, the draper decks 12 may assume the centre open position illustrated if it is so desired. The operator will activate the hydraulic motors 41 in opposite directions and the draper decks 12 will assume the positions adjacent each respective side of the table 15. The drive pulleys 34 will be given a direction of rotation such that the top surface of the belts 33 will move in opposite directions so as to carry the crop to the centre of the swather 10 and to deposit it, again as illustrated in FIG. 1C.

Many modifications to the invention may be contemplated by those skilled in the art to which it relates and the specific embodiments described should be taken as illustrative only and not as limiting the scope of the invention as construed in accordance with the accompanying claims.

We claim:

1. In a swather having a frame;
a transverse table connected on said frame; a first draper deck mounted on said table and having an endless belt supported thereon for rotational movement in a transverse direction; first power means operably connected to said first draper belt for selectively rotating said first draper belt in a first transverse direction and in a second transverse direction opposite to said first transverse direction; and movement means operably associated with said first draper deck to effect movement of said first draper deck relative to said table, an improved movement means comprising:
a first rotatable pinion fixed to said table and being selectively rotated by a first drive means; and
a first chain having first and second transversely spaced ends connected to said first draper deck, said chain being engaged with said pinion so that rotation of said pinion effects a transverse translational movement of said chain and said first draper deck connected thereto.

2. The swather of claim 1 wherein said drive means comprises a hydraulically driven motor connected to said pinion to cause rotation thereof.

3. The swather of claim 2 wherein said swather further includes a second draper deck mounted on said table and having a second endless draper belt supported thereon for rotational movement in a transverse direction; and a second power means for operably powering the rotation of said second draper belt.

4. The swather of claim 3 wherein said table is provided with a second rotatable pinion fixed thereto and selectively rotatably driven by a second drive means, said second pinion being engaged with a second chain coupled to said second draper deck at transversely spaced points such that the rotation of said second pinion causes a transverse translational movement of said second chain and said second draper connected thereto.

5. The swather of claim 4 wherein said first and second power means include a hydraulically driven drive pulley.

6. A pull-type swather comprising:
a frame adapted for movement along a direction of travel and including a table affixed thereto and extending in a transverse direction substantially perpendicular to said direction of travel;
a hitch pivotally connected to said frame and adapted for connection to a prime mover, said hitch being connected to a hydraulic cylinder interconnecting said hitch and said frame to pivotally move said hitch relative to said frame;
a first draper deck mounted on said table for transverse translational movement relative thereto, said first draper deck including an endless draper belt rotatably movable to convey crop thereon in transverse directions and a first power means operably associated with first draper belt to effect rotation thereof selectively in a first transverse direction and in an opposing second transverse direction; and
a first movement means operatively associated with said first draper deck to effect said transverse translational movement thereof, said first movement means including a first rotatable pinion fixed to said table and being selectively rotated by a first drive means, said first movement means further including a first chain having first and second transversely spaced ends connected to said first draper deck and being engaged with said first pinion such that rotation of said first pinion effects a transverse movement of said first chain and a corresponding translation of said first draper deck connected thereto.

7. The swather of claim 6 further comprising a second draper deck movably supported on said table for transverse translational movement, said second draper deck having a second rotatable endless draper belt operably driven by a second power means for movement of crop thereon in said first and second transverse directions.

8. The swather of claim 7 wherein said second draper deck has a second chain connected thereto at transversely spaced points, said second chain being engaged with a second rotatable pinion fixed to said table and being selectively rotatably driven by a second drive means such that rotation of said second pinion causes a transverse movement of said second chain and a corresponding translation of said second draper deck.

9. The swather of claim 8 wherein each of said first and second drive means comprises a hydraulically driven motor connected to the respective said pinion.

10. The swather of claim 9 wherein said hydraulically driven motors are selectively operable to rotate the corresponding said pinion in first and second opposing directions so that the respective said draper decks can be selectively translationally moved in said first and second transverse directions.

11. The swather of claim 10 wherein said first and second power means include hydraulically driven drive pulleys engaged with the corresponding said draper belt to cause rotation thereof.

* * * * *